(12) United States Patent
Beck

(10) Patent No.: US 6,964,245 B2
(45) Date of Patent: Nov. 15, 2005

(54) PORTABLE CALF PEN AND METHOD OF USE

(76) Inventor: Virgil Beck, 3327 Woodland Hill Dr. SE., Bemidji, MN (US) 56001-8317

( * ) Notice: Subject to any disclaimer, the term of this patent is extended or adjusted under 35 U.S.C. 154(b) by 0 days.

(21) Appl. No.: 10/820,657

(22) Filed: Apr. 8, 2004

(65) Prior Publication Data

US 2005/0224011 A1 Oct. 13, 2005

(51) Int. Cl.⁷ ............................................. A01K 3/00
(52) U.S. Cl. ..................................... 119/512; 119/843
(58) Field of Search ....................... 119/512, 510, 843, 119/840, 732

(56) References Cited

U.S. PATENT DOCUMENTS

| | | | |
|---|---|---|---|
| 3,095,858 A | 7/1963 | Bauer | 119/744 |
| 3,237,602 A * | 3/1966 | Rens | 119/752 |
| 3,931,796 A | 1/1976 | Hoffman | 119/801 |
| 4,821,679 A | 4/1989 | Hackert | 119/502 |
| 5,138,981 A | 8/1992 | Akins | 119/732 |
| 5,186,125 A * | 2/1993 | Halyung | 119/712 |
| 5,291,857 A * | 3/1994 | Braun, Jr. | 119/751 |
| 5,372,092 A | 12/1994 | Pederson | 119/510 |
| 5,655,484 A | 8/1997 | Aaberg | 119/735 |
| 5,785,006 A | 7/1998 | Prentice | 119/732 |
| 5,924,385 A | 7/1999 | Cossel | 119/512 |
| 6,035,808 A | 3/2000 | Herman | 119/732 |

\* cited by examiner

*Primary Examiner*—Teri Pham Luu
*Assistant Examiner*—Kimberly S. Smith
(74) *Attorney, Agent, or Firm*—Dicke, Billig & Czaja, PLLC

(57) ABSTRACT

A method of isolating a newborn calf from the calf's mother. A rigid pen, including an outer frame defining an open floor attached to a motorized vehicle. The vehicle is operated to raise the pen off the ground and deliver the raised pen to an area at which the calf and the mother cow are located. The vehicle then positions the raised pen over the calf. Finally, the pen is lowered such that the calf is inside of the pen and the mother cow is outside of the pen. In one embodiment, the frame defines an opening at a side adjacent the motorized vehicle, with the method further including the vehicle operator entering the pen via the opening. In one embodiment, the pen further includes a foldable inner cage attached to an interior of the frame.

15 Claims, 3 Drawing Sheets

PORTABLE CALF PEN AND METHOD OF USE

BACKGROUND

The present invention relates to a portable pen and related method of use for isolating a newborn calf from the calf's mother. More particularly, it relates to a portable pen and method of use that provides a user with a safe, enclosed area in which to attend to a newborn calf without fear of being attacked by the mother cow.

One of the many daily jobs associated with farming is attending to cows, along with other farm animals. Like most animals, cows instinctively seek to protect their newborn calves from harm, whether actual or perceived. Often times, the mother cow will attack or otherwise aggressively approach a human or animal that is attempting to interact with a newborn calf.

Due to their large size, the protective nature of a mother cow can prove highly dangerous to a farmhand. In particular, the farmer or cattleman must attend to a newborn calf shortly after birth and periodically thereafter. Where the newborn calf and mother cow are located in a relatively open area, it is virtually impossible for the farmhand to approach the newborn calf without being attacked by the mother cow.

One solution to the above problem is to isolate the calf from its mother. For example, most farms have immovable, permanently installed fences or pens. Once inside of the fenced area, the calf is effectively isolated from the mother cow. However, this technique still requires the farmhand to somehow guide the mother cow outside of the fenced area (and thus away from the calf), an action that the mother cow will resist. Conversely, it may be possible to place the calf on a platform or similar apparatus, and then transport the platform to a location away from the mother cow. Again, however, the farmhand is entirely unprotected from advances of the mother cow while loading the calf. Finally, calf-birthing pens have been suggested, such as in U.S. Pat. No. 5,924,385, in which the calf is immediately separated from its mother following birth. Unfortunately, the mother cow will likely resist being restrained within a birthing pen, possibly leading to complications during birth.

Attending to a newborn calf is a common task performed by farmers and cattlemen. A protective mother cow can make this task exceedingly dangerous. Unfortunately, suggested techniques for separating the newborn calf from the mother cow focus upon guiding or otherwise driving the mother cow away from the newborn calf and are normally resisted by the mother cow. Therefore, a need exists for an apparatus and related method of use for isolating a newborn calf from its mother in a relatively non-obtrusive manner that provides the farmer or cattleman with full protection from the mother cow.

SUMMARY

One aspect of the present invention relates to a method of isolating a newborn calf from the calf's mother. The method includes providing a portable, rigid pen including an outer frame defining an open floor. The pen is attached to a motorized vehicle. The vehicle is operated to raise the pen off of the ground. The vehicle is then driven to bring the raised pen to an area at which the calf and the mother cow are located. A confirmation is then made that a bottom of the pen is raised to a height greater than a height of the calf. The vehicle is operated to position the raised pen over the calf. Finally, the pen is lowered such that the calf is inside of the pen and the mother cow is outside of the pen. In one preferred embodiment, the frame defines an opening at a side adjacent the motorized vehicle, with the method further including the motor vehicle operator entering the pen from the motorized vehicle via the opening. In another preferred embodiment, the pen further includes a foldable inner cage attached to an interior of the frame. With this in mind, one preferred method further includes unfolding the cage, placing the newborn into the inner cage, raising the pen, and using the motorized vehicle to move the pen otherwise maintaining the calf to a location away from the other cow.

Another aspect of the present invention relates to a portable pen for use in separating a newborn calf from the calf's mother. The pen includes a frame and a coupling device. The frame defines a front, a back, and opposing sides that combine to define an interior pen area. In this regard, the pen is characterized by an open floor. Further, the front forms an enlarged opening that is otherwise larger than the opening defined by at least one of the back and opposing sides. The coupling device is mounted to an exterior of the front of the frame and is adapted for connection to a corresponding mounting component of a motorized vehicle. In one preferred embodiment, the pen further includes a door hingedly attached to the back of the frame. In this regard, attachment of the door is such that the door can swing inwardly or outwardly relative to the frame.

DETAILED DESCRIPTION

Figure 1:
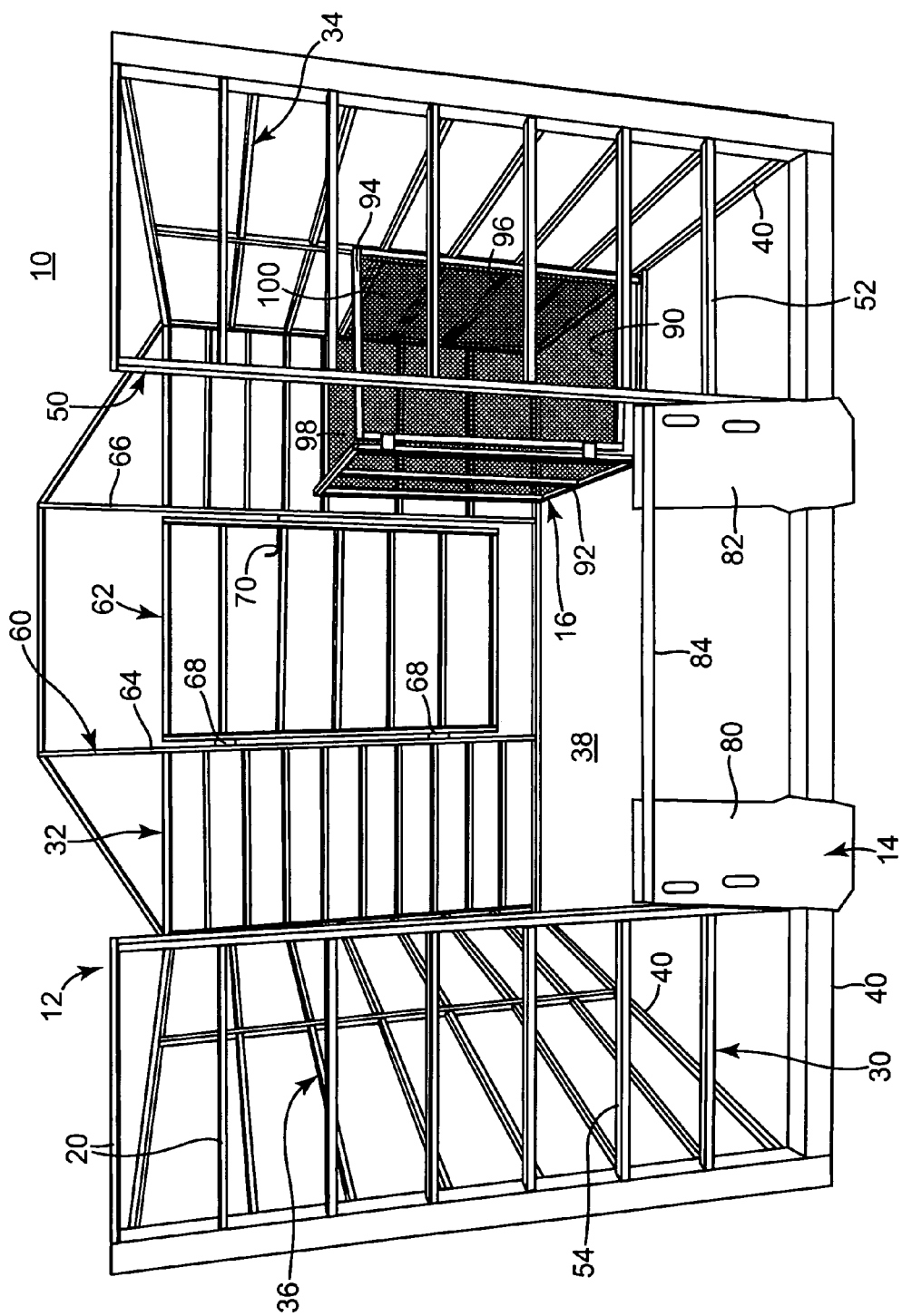
FIG. 1 is a perspective view of one embodiment of a portable pen in accordance with the present invention including an inner cage in an unfolded state.

One embodiment of a portable pen 10 in accordance with the present invention is shown in FIG. 1. The pen 10 includes a frame 12, a coupling device 14, and an inner cage 16. These components are described in greater detail below. In general terms, the coupling device 14 is attached to an exterior of the frame 12, whereas the inner cage 16 is attached to an interior of the frame 12. During use, the coupling device 14 facilitates attachment of the pen 10 to a motorized vehicle (shown, for example at 18 in FIG. 3) that is otherwise used to lift and transport the pen 10. In this regard, the pen 10 can be placed over and around a newborn calf (not shown) to isolate the newborn calf from the mother cow (not shown). Further, where provided, the inner cage 16 is available to assist in moving the newborn calf to a remote location.

The frame 12 is comprised of rigid metal horizontal bars (referenced generally at 20), and defines a front 30, a back 32, and first and second opposing sides 34, 36 that combine to define an interior region 38. Further, the front 30, the back 32, and the opposing sides 34, 36 have a common bottom beam 40. The frame 12 does not include a bottom wall or other structure extending between the bottom beams 40, except for the inner cage 16 as described below. That is to say, the frame 12 is characterized as having an open bottom. In one embodiment, the frame 12 is square in transverse cross-section, having dimensions on the order of 8 ft.×8 ft. Alternatively, other shapes and dimensions are equally acceptable. Further, in one embodiment, the frame 12 has a fairly substantial height, on the order of approximately 5.5 ft. Alternatively, other heights are equally acceptable; preferably, however, the frame 12 has a height greater than a height of an average cow (on the order of 3.5 ft.).

The front 30 defines an opening 50. For example, in one embodiment, the front 30 includes first and second side sections 52, 54, with the opening 50 being defined as a spacing between the sections 52, 54. In one embodiment, the opening 50 extends to the bottom beam 40. Alternatively, the opening 50 can encompass less than an entire height of the front 30. Regardless, the opening 50 is preferably centered relative to a width of the front 30, and has a width on the order of 4 ft. Other dimensions are equally acceptable. As a point of reference, however, spacings are established between adjacent ones of the horizontal bars 20; the opening 50 is larger than the spacing between the bars 20. As described in greater detail below, the opening 50 allows a user (not shown) to enter and exit the interior region 38 of the frame 12.

In one preferred embodiment, the back 32 forms an opening 60 within which a door 62 is disposed. In particular, the back 32 includes first and second door frame members 64, 66. The door 62 is mounted to the first doorframe member 64 by a plurality of hinges 68. In this regard, the hinges 68 are preferably configured to allow the door 62 to swing inwardly or outwardly relative to the frame 12. In one embodiment, the door 62 further includes a latching member 70 adapted to selectively engage the second doorframe member 66. For example, in one preferred embodiment, the latching member 70 includes a spring-loaded dowel, the leading end of which is sized to be selectively received within an aperture (not shown) formed in the second doorframe member 66. With this configuration, then, the latching member 70 can selectively lock and unlock the door 62 relative to the second doorframe member 66. Alternatively, a wide variety of other latching techniques are equally acceptable.

In one embodiment, the coupling device 14 includes first and second plates 80, 82 and a cross bar 84. The first and second plates 80, 82 and the cross bar 84 are configured for attachment to a conventional coupling body provided with skid steer loaders. As such, the plates 80, 82 extend in an angular fashion, sloping inwardly relative to front 30. The cross bar 84 extends across the first and second plates 80, 82, and provides a surface for engaging the mounting component associated with the motorized vehicle (for example, the motorized vehicle 18 of FIG. 3). Alternatively, the coupling device 14 can assume a wide variety of other forms suitable for attachment to a corresponding component of the motorized vehicle. Preferably, however, the coupling device 14 is configured to position the motorized vehicle in close proximity to the front 30 of the frame 12 as described in greater detail below.

The inner cage 16 is shown in FIG. 1 as being attached to the side 34. Alternatively, the inner cage 16 can be attached to any other portion of the frame 12. Regardless, the inner cage 16 is positioned within the interior region 38 of the frame 12 and, in one preferred embodiment, includes a floor 90, a sidewall 92, and a door 94. The floor 90 extends from the frame 12 to the sidewall 92. The door 94 is openable relative to the sidewall 92. In one preferred embodiment, the door 94 is hinged to the frame 12, and includes a latch (not shown) that selectively secures the door 94 to the sidewall 92. Regardless, in one embodiment, the floor 90 is of a continuous nature, such as a wood or metal platform, whereas the sidewall 92 and the door 94 are covered by a screen 96 or similar material that facilitates viewing of an interior of the inner cage 16. In a further preferred embodiment, a screen 98 is secured to the back 32 of the frame 12 in a region of the inner cage 16, and a screen 100 is secured to the first side 34 of the frame 12 in a region of the inner cage 16. With this construction, access to the inner cage 16 via spacing between the bars 20 associated with the frame 12 is limited.

Figure 2:
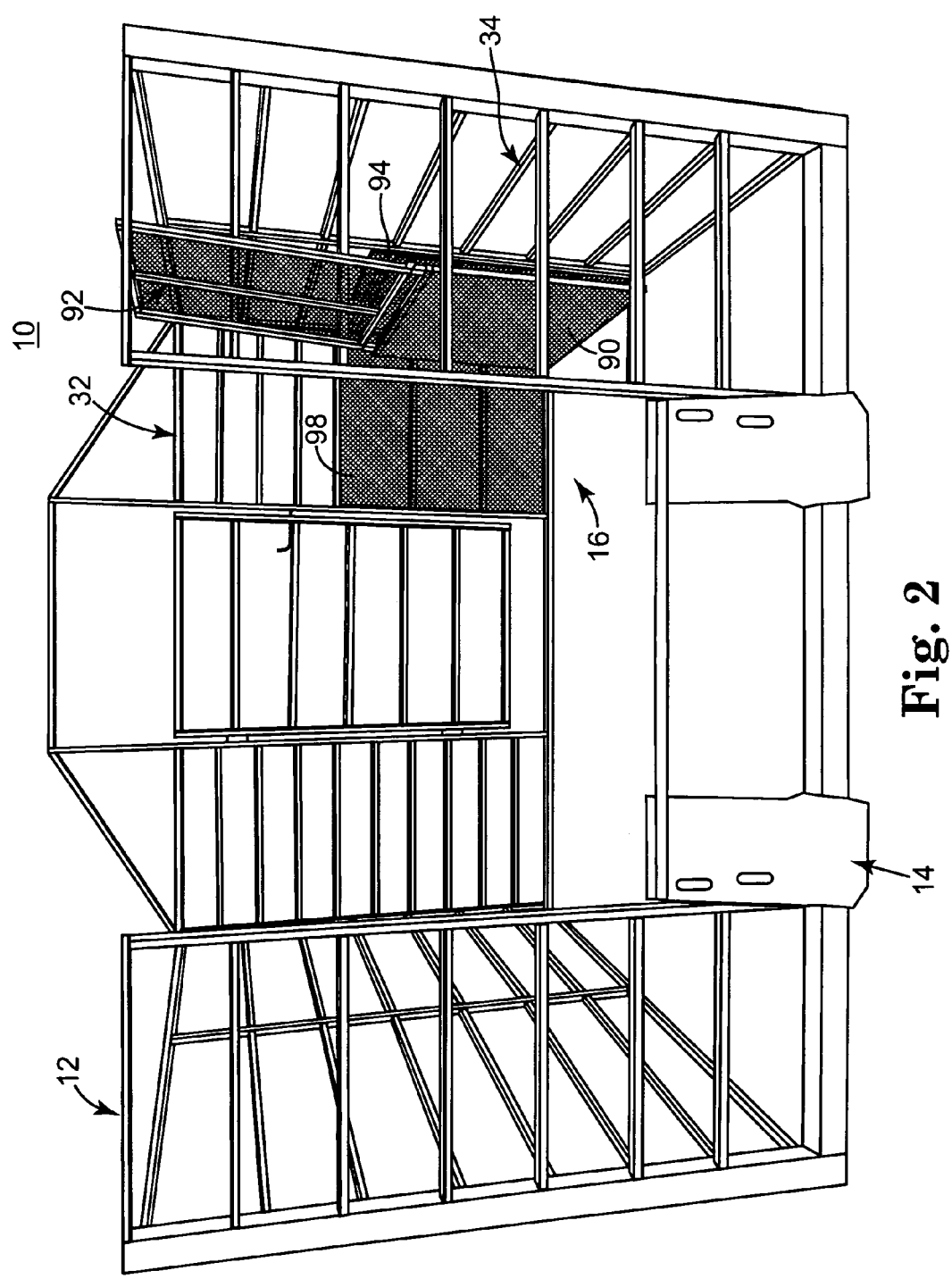
FIG. 2 is a perspective view of the pen of FIG. 1, with the inner cage in a folded state.

In one embodiment, the inner cage 16 is configured to be retractable or transitionable from the unfolded state of FIG. 1 to a folded state as shown in FIG. 2. In this regard, and in one embodiment, the floor 90 is pivotably mounted to the side 34 of the frame 12 such as by one or more hinges (not shown), and is not otherwise secured to the back 32 of the frame 12. Similarly, the sidewall 92 is pivotably mounted to the floor 90, such as by hinges (not shown), and is not otherwise rigidly mounted to the back 32 of the frame 12. With this configuration, then, the inner cage 16 can be transitioned from the unfolded state of FIG. 1 to the folded state of FIG. 2 by swinging the door 94 away from the sidewall 92, and then pivoting the floor 90 and the sidewall 92 upwardly against the side 34 of the frame 12 as shown in FIG. 2. A latching device (not shown) can further be provided with the sidewall 92 that otherwise selectively secures the sidewall 92 to the side 34 of the frame 12 in the unfolded state of FIG. 1. In a further embodiment, the hinged mounting of the sidewall 92 to the floor 90 allows the sidewall 92 to fully unfold relative to the floor 90 such that the sidewall 92 and the floor 90 can rest on the ground (not shown) in an additional, second unfolded state. While in this second unfolded state, a calf (not shown) can more easily be positioned on the unfolded sidewall 92 and/or floor 90. Alternatively, a variety of other constructions are equally acceptable. In an alternative embodiment, the inner cage 16 is permanently maintained in the unfolded state shown in FIG. 1.

In one preferred embodiment, a bin (not shown) is mounted to an interior of the frame 12 such as along one of the front 30, back 32, and/or opposing sides 34, 36. The bin provides a convenient location for a user to store necessary supplies during transport of the pen 10.

Figure 3:
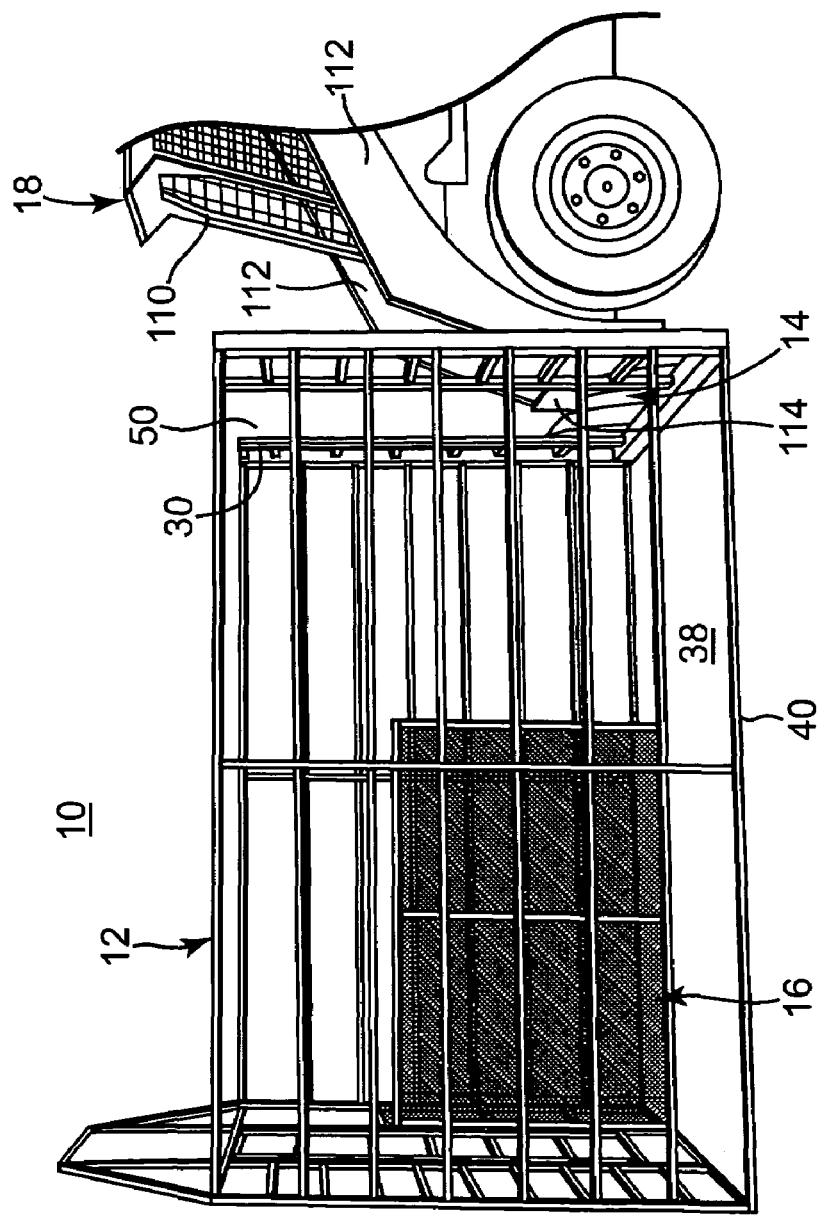
FIG. 3 is a side, perspective view of the pen of FIG. 1 coupled to a motorized vehicle in accordance with a method of the present invention.

Prior to use, the pen 10 is stored with the bottom beam 40 on the ground. During use, and with reference to FIG. 3, the motorized vehicle 18 is driven toward the pen 10 and attached to the coupling device 14. In one embodiment, the motorizing vehicle 18 is a skid steer loader, for example, a skid steer loader sold under the trade name BOBCAT® made by Bobcat Company Business Unit of Ingersoll-Rand Company. Regardless, the motorized vehicle 18 includes a cab 110, moveable arms 112, and a front end attachment device 114. The motorized vehicle is driven toward the pen 10 such that the front end attachment device 114 engages the coupling device 14. Once properly engaged, the moveable arms 112 are actuated to lift the pen 10 off of the ground (un-numbered in FIG. 3). While the inner cage 16 is shown in FIG. 3 as being in an unfolded state, in an alternative embodiment, the inner cage 16 is folded prior to movement of the pen 10.

Regardless, the motorized vehicle 18, including the mounted pen 10, is driven to a location of the newborn calf (not shown) and the calf's mother cow. Notably, the motorized vehicle 18 is preferably a machine that is otherwise commonly used on the premises in question (e.g., a farm), and in particular is normally operated in close proximity to the mother cow. With this preferred embodiment, then, the mother cow is less likely to become alarmed upon seeing and hearing the motorized vehicle 18 as it approaches the newborn calf.

Once the pen 10 is relatively close to the newborn calf (not shown), the user operates the motorized vehicle 18 to further lift the pen 10. In particular, the bottom beam 40 of the frame 12 is lifted to a height that is greater than a height of the newborn calf. Once the pen 10 has been sufficiently raised, the motorized vehicle 18 is further driven such that the pen 10 is over or above the newborn calf. It has been found that upon being approached by the pen 10 of the present invention in conjunction with the motorized vehicle 18, the mother cow (not shown) will move away from the newborn calf. The motorized vehicle 18 is then operated to lower the pen 10 until the bottom 40 rests on the ground (un-numbered in FIG. 3), with the newborn calf being positioned within the interior region 38 of the frame 12. The user (not shown) then exits the cab 110 and enters the interior region 38 of the frame 12. In particular, the user enters the pen 10 via the opening 50 in the front 30 of the frame 12. In this regard, the close proximity of the motorized vehicle 18, and in particular, the cab 110, relative to the front 30 of the frame 12 allows the user to enter the pen 10 without stepping on the ground outside of the pen 10.

Once inside the interior region 38, the user (not shown) can perform various operations on the newborn calf (not shown). In this regard, the motorized vehicle 18 effectively closes the opening 50 relative to the mother cow (not shown). In particular, due to the close proximity between the motorized vehicle 18 and the front 30 of the frame 12, the mother cow cannot fit between the motorized vehicle 18 and the frame 12 in a way that would otherwise afford the mother cow access to the opening 50.

Where necessary, the newborn calf (not shown) can be transported to a separate location using the pen 10 of the present invention. In particular, the inner cage 16 is positioned in the unfolded state (best shown in FIG. 1). The door 94 is opened, and the user (not shown) places the newborn calf on the floor 90. The door 94 is then closed, thus securing the newborn calf within the inner cage 16. Alternatively, the floor 90 and the sidewall 92 are both unfolded relative to the frame 12 such that the floor 90 and the sidewall 92 rest on the ground. The newborn calf can then be placed on one or both of the floor 90/sidewall 92. Regardless, the user then exits the pen 10 and returns the cab 110 of the motorized vehicle 18. The motorized vehicle 18 is operated to raise the moveable arms 112, and thus the pen 10 including the newborn calf otherwise secured within the inner cage 16. Once the pen 10 has been raised a sufficient distance above ground level, the motorized vehicle 18 is driven to the desired location. The user then releases the newborn calf from the inner cage 16, such as by opening the door 94 and lifting or guiding the newborn calf from the inner cage 16. Subsequently, the newborn calf can be released from the frame 12 by lifting the pen 10. Alternatively, the door 62 can be opened, and the motorized vehicle 18 operated to move the pen 10 away from the newborn calf, with the opening 60 (FIG. 1) providing clearance for the newborn calf. In this regard, by allowing the door 62 to preferably open inwardly or outwardly relative to the frame 12, the newborn calf can be released at a wide variety of locations, such as against or in close proximity to a structure, wall, etc.

The portable pen and related method of use of the present invention provides a marked improvement over previous designs. Newborn calves are readily isolated from their mother cow, and a structure is provided that allows the user to easily gain access to the pen while preventing access by the mother cow.

Although the present invention has been described with reference to preferred embodiments, workers skilled in the art will recognize that changes can be made in form and detail without departing from the spirit and scope of the present invention.

What is claimed is:

1. A method of isolating a newborn calf from the calf's mother, the method comprising:
   a) providing a rigid pen having an open floor;
   b) attaching the pen to a motorized vehicle;
   c) operating the vehicle to raise the pen off of the ground;
   d) driving the vehicle and raised pen to an area at which the calf and the mother cow are located;
   e) confirming that a bottom of the pen is raised to a height greater than a height of the calf;
   f) operating the motorized vehicle to position the raised pen over the calf; and
   g) lowering the pen onto the ground such that the calf is inside of the pen and the mother cow is outside of the pen.

2. The method of claim 1, wherein step e) further includes operating the vehicle to further raise the bottom of the pen to a height greater than a height of the calf.

3. The method of claim 1, wherein steps a)–g) are performed by a user operating the motorized vehicle, the method further comprising:
   h) the user exiting the motorized vehicle and entering the pen.

4. The method of claim 3, wherein the pen defines a front having a coupling device for attachment to the motorized vehicle and defining an opening, and further wherein step h) is characterized by the user entering the pen through the opening.

5. The method of claim 4, wherein step h) is further characterized by the user not touching the ground until inside of the pen.

6. The method of claim 4, wherein step h) is further characterized by the mother cow being impeded from entering the pen via the opening.

7. The method of claim 6, wherein the motorized vehicle includes a front end positioned adjacent the front of the cage following step b), and further wherein step h) is further characterized by a spacing being established between the front end of the motorized vehicle and the front side of the pen, the spacing being less than an approximate width of an adult cow.

8. The method of claim 1, wherein the pen includes an outer frame and an inner cage connected to, and positioned within, the frame, the method further comprising:
   h) directing the calf into the inner cage.

9. The method of claim 8, further comprising:
   i) raising the pen, including the calf within the inner cage.

10. The method of claim 9, further comprising:
    j) driving the vehicle, including the pen and the calf within the inner cage, to a different location.

11. The method of claim 10, further comprising:
    k) releasing the calf from the inner cage; and
    l) releasing the calf from the pen.

12. The method of claim 8, wherein the inner cage is foldable relative to the frame, the method further comprising:
    unfolding the inner cage prior to step h).

13. The method of claim 1, wherein the method is performed at a farm.

14. The method of claim 1, wherein the motorized vehicle is repeatedly operated apart from the pen in a vicinity of the mother cow.

15. The method of claim 14, wherein the motorized vehicle is a skid steer loader.

* * * * *